United States Patent Office 3,822,993
Patented July 9, 1974

3,822,993
PRODUCTION OF CHROME TANNING COMPOSITION FROM WASTE CHROMIUM-COPPER PICKLING LIQUOR
John W. Robinson, Glen Mills, Pa., and John W. Howard, Skaneateles, Robert E. Hahn, Utica, and Donald C. Hemming, Whitesboro, N.Y., assignors to Revere Copper and Brass Incorporated, New York, N.Y.
No Drawing. Filed Apr. 7, 1972, Ser. No. 242,208
Int. Cl. C14c 3/04, 3/06
U.S. Cl. 8—94.27
10 Claims

ABSTRACT OF THE DISCLOSURE

A chrome tanning composition is obtained from the waste liquor resulting from the pickling of cupreous material with an aqueous sulfuric acid-sodium dichromate solution by reducing at least most of the hexavalent chrominum content of the concentrated waste liquor to the trivalent state, and by then lowering the copper content of the waste liquor to a maximum of about 8 grams per liter by electrolysis or by adding to the liquor a metal which will displace copper from the liquor. The method further includes the steps of neutralizing the aqueous solution to obtain therein a ratio of hydroxyl to trivalent chromium ions in the chromic salt solution within the range of about 1:3 to 2:1 and the step of concentrating the waste liquor to at least a total chromium content of about 0.4 pound per gallon (expressed as $Cr_2O_3$), both of which steps can be carried out at any stage of the method. The resulting product liquor can be used directly for tanning or can be dehydrated to a tanning salt composition.

This invention relates to the recovery of useful constituents of the waste liquor obtained from the pickling of cupreous material with an aqueous sulfuric acid-sodium dichromate solution and, more particularly, to the recovery of these constituents in the form of a chrome leather tanning composition.

Pickling liquors for the removal of scale from copper and brass mill products generally comprise about 10% by weight of sulfuric acid and about 10% by weight of sodium dichromate dihydrate. The spent or waste liquor from the pickling operation contains dissolved copper, and from about 40 to 90% of its original hexavalent chromium is in the trivalent state in the form of chromic sulfate. Prominent in the minds of those who produce this waste liquor is a use or treatment of the liquor to utilize its chromium or copper content, or both. Recovery of the copper by cementation has been considered but the expense of the added cementation metal has generally offset the value of the recovered copper when the recovered copper was the only valuable product of the recovery treatment.

It has now been found that if the copper component of waste cupreous pickling liquor is sufficiently removed under the proper conditions, the recovered copper is a bonus in obtaining a valuable chrome leather tanning composition. That is, the removal of the copper should be effected under sufficiently reactive conditions to make its recovery effective and it should be carried out under conditions wherein the copper-recovery means is not consumed in converting the hexavalent chromium content of the waste liquor to the trivalent state useful in tanning leather.

Pursuant to this discovery, the method of the present invention produces a chrome leather tanning composition from the waste liquor obtained by the pickling of cupreous material with an aqueous solution of sulfuric acid and sodium dichromate with the result that the liquor comprises an aqueous acidic cupreous solution which contains hexavalent and trivalent chromium compounds. This method comprises subjecting the chromium-containing cupreous solution to a chromium-reducing treatment to convert its hexavalent chromium to trivalent chromium to the extent of lowering the hexavalent chromium content to at least about 2 grams per liter (expressed as elemental chromium), and lowering the copper content of the resulting predominantly trivalent chromium-containing solution to a maximum of 8 grams per liter (expressed as elemental copper) by subjecting said solution to a copper-reducing treatment capable of reducing said copper content to metallic copper. The method further includes a neutralizing step and an evaporation step either of which can be carried out at any stage in the method. The concentration step is effected by evaporation to an extent sufficient to raise the total chromium content (expressed as $Cr_2O_3$) in the product solution to about 0.4 to 1.5 pounds per gallon, and the neutralization step is carried out to an extent sufficient to obtain a final product solution having a ratio of hydroxyl ions to trivalent chromium ions within the range of about 1:3 to 2:1.

The aqueous waste pickling liquor which is used as the starting material in the practice of the invention is that which results from the pickling of a cupreous material such as copper or brass with an aqueous solution of sodium bichromate and sulfuric acid. The waste liquor, after the pickling operation, generally has a specific gravity of about 1.1 to 1.5 and contains about 20 to 80 grams per liter of chromium (expressed as elemental chromium) about 14 to 50% of which is in the hexavalent form of the dichromate ion ($Cr_2O_7^=$) and the remainder of which is in the form of chromic sulfate (trivalent chromium), with about 90 to 270, and typically about 160, grams per liter of free $H_2SO_4$. The liquor further contains dissolved copper to the extent of about 10 to 60 grams per liter (expressed as elemental copper) and also contains dissolved zinc when the pickling liquor has been used to clean brass.

For the chromium content of this waste liquor to be useful as a tanning agent for leather, it must be in the trivalent state, and hence all, except for a small portion, of its hexavalent chromium content must be reduced to the trivalent state. In addition, the copper content of the liquor must be predominantly removed because of the "off" color which copper tends to impart to leather during tanning. The copper content of the liquor can be lowered by conventional cementation agents or by electrolysis, but in the presence of hexavalent chromium a substantial portion of the resulting cement copper, or of the electrolyzing current, is consumed in reducing the hexavalent chromium to its trivalent state. This is not only inefficient but results in an excessive build-up of soluble copper salt in the treated waste liquor when a cementation agent is used. It has been found, however, that the desired results can be obtained by first effecting reduction of most if not all of the hexavalent chromium to trivalent chromium with a reducing agent which does not remove the copper content of the liquor in the form of metallic copper and by subsequently effecting removal of copper from the predominantly chromic ion-containing liquor by appropriate means.

The chromium concentration of the liquor must ultimately be increased in order to be useful as a leather tanning agent. Although this concentration can precede both the reduction of the chromium and removal of the copper by concentrating the waste liquor in its as-obtained condition, it has been found that the chromium reduction and copper removal reaction appear to be somewhat more effective when the chromium-containing solution is in its as-obtained concentration. On the other hand, neutralization of the chromium-containing solution is easier in its dilute as-obtained form.

The neutralizing step for converting the chromium-containing solution to a chrome leather tanning agent requires adjustment of its basicity to between 1/3 and 2/3, that is, adjustment of its ratio of hydroxyl ions to chromium ions to a value within the range of about 1:3 and 2.1, which is the useful range already established in the art of chrome leather tanning. The acidity is calculated, pursuant to the official method of the American Leather Chemists Association, for both the free acid ($H_2SO_4$) and the acid combined with chromium, and hence the percent acidity is defined as:

$$\frac{\text{the number of equivalents of acid } SO_4}{\text{the number of equivalents of } Cr_2O_3} \times 100$$

and the percent basicity is 100 minus the percent acidity. The equivalents of acid $SO_4$ (as $SO_4^=$) is its molecular weight/2 and the equivalent weight of $Cr_2O_3$ is its molecular weight/6. Thus, at the aforementioned ratio of hydroxyl to chromium ions, the required basicity is between about 11% and 66⅔%.

The basicity of the chromium-containing solution is obtained by neutralizing it with an alkaline compound such as sodium carbonate, sodium bicarbonate, or other alkali such as sodium hydroxide, or with borax or other alkaline compound such as calcium carbonate, calcium hydroxide or a water slurry of slaked lime. Calcium carbonate is presently preferred as the neutralizing agent because it removes the sulfate ions from the solution as insoluble calcium sulfate rather than leaving the sulfate ions in solution from which sodium sulfate may later crystallize during the copper-removal step and thus contaminate the recovered copper.

When neutralizing with any such alkaline material to a hydroxyl:chromium ion ratio between 1:3 and 2:1, the final product chrome tanning solution will contain (a) between about 0.4 to 1.5 pounds, and preferably about 1.0 pound, per gallon of trivalent chromium expressed as $Cr_2O_3$ although it is usually present in the form of $Cr(OH)SO_4$ or $Cr_2(OH)_4(SO_4)_2$, or mixtures thereof, and (b) about 0.1 to 0.5 pound, and preferably about 0.25 pound, of aluminum in the form of $Al(OH)SO_4$, as well as free sulfuric acid and substantially inactive by-product salts.

The chromium-containing solution, whether previously neutralized or not, is subjected to a chromium-reducing treatment in which most, and preferably all, of its hexavalent chromium content is reduced to the trivalent state. In the process of the invention, when complete reduction of the hexavalent chromium is desired, any of the relatively inexpensive conventional reducing agents can be employed such, for example, as sulfur dioxide gas, sodium sulfite or sugar. It is preferred, however, not to use an acidified solution of sodium thiosulfate because of the formation of deleterious copper sulfide from these copper-containing solutions. The reduction of the hexavalent chromium is carried out to the extent that the hexavalent chromium content of the solution is lowered to a maximum of about 2 grams per liter (expressed as elemental chromium). Such a residual amount of hexavalent chromium is not sufficient to impair the efficiency of the following copper-removal operation, although the latter operation is most efficient when the hexavalent chromium content of the solution is about 0.5 grams per liter or less.

Removal of copper from the hexavalent chromium-depleted chromic ion-containing liquid is then effected pursuant to the presently preferred embodiment of the invention by cementation resulting from the addition of any metal higher than, and therefore capable of replacing, copper in the electromotive series. The copper can also be removed by conventional electrolysis using; for example, a platinum anode. Particularly useful cementation metals include iron, aluminum and zinc and alloys of these metals. Both aluminum and zinc effect removal of the copper without adding excessive leather color-imparting ions to the solution and are readily capable of lowering the copper content (as elemental copper) well below the 8 grams per liter level characteristic of electrolytic removal of the copper. Any residual copper ions and ions of the copper-replacement metal such as iron, aluminum or zinc which remain in the final chromium-containing tanning product can be compensated for its color-imparting characteristic by the addition of dyes and similar expedients conventionally used in the leather tanning art. In practicing the invention, it is preferred to add quantities of aluminum or zinc, or both, sufficient to reduce the copper content of the liquor to at least about 4 grams per liter, expressed as elemental copper, with the result that the elemental aluminum and zinc contents of the thus-treated liquor do not exceed about 0.8 and about 3.5 ounces per gallon, respectively. Within these ranges, both the aluminum and the zinc serve as tanning agents in the final composition and, in fact, appear to have a synergistic effect on the chromium as a tanning agent. When aluminum alone is used as the cementation agent, its initial effectiveness is enhanced, as is well known, by the addition of chloride ions, as by adding about 2 grams per liter of sodium chloride to the chromium-containing solution.

The concentration step of the method of the invention advantageously comprises evaporative concentration of the chrominum-containing solution by heating if for a period sufficient to raise its total chromium content to an effective leather-tanning concentration of at least about 0.4 pound, and advantageously to between 0.5 and 1.5 pounds, of chromium (expressed as $Cr_2O_3$) per gallon of liquor.

The final product solution can be used directly as a chrome leather tanning liquor or can be evaporated to dryness for distribution or storage as a dry salt mixture readily available for use by dissolving it in water.

The following examples are illustrative but not limitative of the practice of the invention:

Example I

A copper pickling liquor comprising about 10% by weight of $H_2SO_4$ and about 10% by weight of $Na_2Cr_2O_7 \cdot 2H_2O$, after being used for its effective life as a pickling agent for copper and brass mill products, contained about 37 grams per liter of free $H_2SO_4$, about 51 grams per liter of hexavalent chromium expressed as $NA_2Cr_2O_7 \cdot 2H_2O$, about 24 grams per liter of trivalent chromium expressed as $Cr_2(SO_4)_3$, about 70.5 grams per liter of copper expressed as $CuSO_4$ and about 38.5 grams per liter of zinc expressed as $ZnSO_4$, and had a specific gravity of 1.3. This waste liquor was then boiled to reduce its volume to about 70% of its original volume and thus approximately 1.45 times the original concentration of its contained salts. The concentrated waste pickling liquor was treated by bubbling sulfur dioxide gas through it for a sufficient period of time to reduce substantially all of the hexavalent chromium (in the sodium dichromate) to trivalent chromium (in the form of chromic sulfate). To the resulting liquor there was added a 70:30 aluminum-zinc alloy powder in amount stoichiometrically in excess of the copper content of the waste pickling liquor. After stirring the mixture for about 120 minutes at a temperature of about 70° to 110° F., the copper content of the liquor was precipitated as metallic copper, leaving a residual copper content of about 4 grams (expressed as Cu) per liter of solution. The precipitated copper was separated by decantation followed by filtration, and the filtrate was neutralized to a pH of about 2.6 by addition of sodium carbonate. The resulting solution contained 84.0 grams per liter of trivalent chromium as $Cr_2O_3$, 5.7 grams per liter of aluminum as Al, 36.0 grams per liter of zinc as Zn and 325 grams per liter of neutral salts principally in the form of sodium sulfate.

The chrome liquor obtained as described hereinbefore was used as a leather tanning agent as follows:

A 5 inch by 6 inch piece of pickling kidskin was secured to the inside of a one-quart ball mill to which there was added 10.5 cc. of the chrome liquor and 44 cc. of a 10% by weight aqueous solution of sodium chloride, as well as several alumina balls. The ball mill was then rotated according to the following schedule wherein sodium bicarbonate in aqueous solution form was added at intervals to maintain the pH of the tanning liquor below about 4.3 in order to obtain proper measurement of shrinkage. Shrinkage was measured by the conventional procedure of heating the leather at a rate of about 3 to 4 degrees Fahrenheit until a temperature was reached at which the skin shrinks perceptively.

| Total elapsed time, ball milling | pH (liquor) | Shrink temp., °F. (skin) | Additives |
|---|---|---|---|
| 0 | 2.5 | | |
| 1 hr | 3.75 | 138 | 4 cc. 10% NaHCO$_3$ solution. |
| 1 hr. 15 min | 4.00 | 167 | Do. |
| 1 hr. 30 min | 4.00 | 168 | Do. |
| 1 hr. 45 min | 4.05 | 186 | 8 cc. 10% NaHCO$_3$ solution. |
| 2 hrs | 4.25 | 194 | |

The final product was an excellently tanned skin having good "feel" and tensile strength with a color somewhat more green than with conventional tanned skin obtained in the same ball mill using a conventional chrome leather tanning liquor having a pH of 2.6, a specific gravity of 1.305,116 grams per liter of $Cr_2O_3$, 220 grams per liter of $SO_4$, 416 grams per liter total of dissolved solids and a basicity of 32–34%.

Example II

A waste pickle liquor from the pickling of cupreous material and containing:

| | G./l. |
|---|---|
| Free sulfuric acid | 223 |
| Divalent copper (as Cu) | 41.4 |
| Total chromium (as Cr) | 32.3 |
| Hexavalent chromium (as Cr) | 6.6 |
| Trivalent chromium (as Cr) | 25.7 | was treated as follows to prepare a useful chrome tanning composition:

A mass of three hundred and seventy-five gallons of the liquor was concentrated to about 56% of its original volume, i.e., to about 210 gallons. To this concentrated solution there was slowly added with constant agitation an amount of solid sodium sulfite sufficient to reduce the contained hexavalent chromium to the trivalent form, and during this period (approximately 3 hours) the temperature rose to approximately 115° F. At the end of this reduction period, and after cooling to room temperature, approximately 87 pounds of a 70:30 zinc-aluminum alloy in the form of turnings were added with agitation over a 4 hour period. This amount of zinc-aluminum alloy was sufficient to displace the entire amount of copper in solution as cement copper, thus reducing the copper concentration in solution to approximately zero. The cement copper was removed by filtration and amounted to approximately 130 pounds when washed and dried.

After cooling the copper-free solution to ambient temperature, sufficient solid sodium carbonate was added to raise the pH of the solution to 2.6 and to adjust its basicity to 33⅓%.

The analysis of the final solution was:

$Cr_2O_3$ equiv.=0.694 lbs./gal.
Hexavalent chromium=0.0 g./l.
Aluminum (as Al)=10.5 g./l.
Zinc (as Zn)=26.0 g./l.
Neutral salts=2.2 lbs./gal.
Sp. Gr.=1.4
pH=2.6

One hundred and forty-two gallons of the solution prepared as described (98.5 lbs. of $Cr_2O_3$ equivalent), together with approximately 35 lbs. of sodium formate, was added to 5000 pounds of pickled cow sides (pH 1.9) in a large tanning drum. Drumming was initiated and continued for a period of 3 hours during which the pH of the skins was permitted to rise only to about 4.2 by the addition of 50 lbs. of sodium bicarbonate slurried in water in three batches at appropriate intervals.

The shrink temperature of these chrome-tanned skins at the end of the drumming and neutralization operation was over 200° F., indicating a completely tanned condition. The tannage was normal in every respect, and the leather was finished for slipper stock by normal methods well known to the tanner.

Example III

A 1000 cc. sample of a waste pickle liquor from the pickling of copper metal had the following analysis:

Free sulfuric acid=37.0 g./l.
Divalent copper (as Cu)=28.0 g./l.
Total chromium (as Cr)=39.9 g./l.
Trivalent chromium (as Cr)=22.1 g./l.
Hexavalent chromium (as Cr)=17.8 g./l.

This solution was treated as follows to obtain a reduced chromium one-bath tanning agent.

Sodium carbonate was added to the solution to provide hydroxyl ions in the final product tanning liquor sufficient to provide a ratio of hydroxyl to chromium ions of 33⅓% and a pH of 2.6. After this neutralization, the contained hexavalent chromium was reduced to the trivalent form by bubbling sulfur dioxide gas through the solution which caused the temperature to rise from 66° F. to 85° F.

To remove the copper from the resulting solution, approximately 41 grams of zinc turnings were added to the solution with stirring. After removing the thus-produced cement copper by filtering, the resulting one-bath tanning solution was concentrated by evaporation of about 56 percent of its original volume and had the following analysis:

Trivalent chromium (expressed as $Cr_2O_3$)=0.8 lb./gal.
Copper (as Cu)=0.0 g./l.
Zinc (as Zn)=41.0 g./l.
Hexavalent chromium (as Cr)=0.00 g./l.

Example IV

Fifty gallons of the aforementioned type of waste pickling liquor having the following composition:

Free sulfuric acid=75.0 g./l.
Divalent copper (as Cu)=27.7 g./l.
Hexavalent chromium (as Cr)=18.3 g./l.
Total chromium (as Cr)=42.3 g./l.

was treated with sulfur dioxide to reduce the hexavalent chromium to less than 1 gram per liter. The resulting solution was electrolyzed to remove copper, using a platinum anode. During electrolysis, the solution was continuously agitated with air and a small amount of sulfur dioxide was continuously introduced to keep the chromium in the trivalent state. Electrolysis was continued until the copper content of the solution (expressed as Cu) was less than 1 oz. per gallon, and the resulting solution was then neutralized and concentrated as in the preceding examples to form an effective tanning liquor.

Example V

To 800 cc. (942 grams) of the aforementioned type of waste pickling liquor containing 111.5 g./l. of free sulfuric acid 16.2 grams of total chromium (as Cr) and 20.7 g./l. of copper ions (as Cu) is added 12.0 grams of dry sodium sulfite over a two minute period with stirring of the solution. At the end of this period, the solution was neutralized to a final pH of 1.8 by adding 75 grams of dry calcium carbonate over a twelve minute period with continuous slurring. The temperature of the solution rose from 66° F during this neutralization, but no significant foaming was noticed when the calcium carbonate was added at the aforementioned rate. At the end of a 121 minute standing period without stirring, the heavy precipitate which formed amounted to 53 percent of the total volume and the clear liquor amounted to 47 percent. This slurry was then agitated and filtered readily under a vacuum of 26.5 inches of mercury. The replacement of the 20.7 g./l. of copper from the clear filtrate was accomplished by adding approximately 10 grams of a 70:30 zinc-aluminum alloy powder with stirring over a 40 minute period. After removing of the resulting cement copper, the residual filtrate was concentrated to a final $Cr_2O_3$ concentration of 1.0 pound per gallon of solution.

This solution was effective for tanning hides and skins as described in Example I.

What is claimed is:

1. A method of producing a chrome tanning composition from a waste pickling liquor comprising an aqueous acidic cupreous solution of hexavalent and trivalent chromium compounds, said liquor being obtained by contacting copper or brass with an aqueous solution of sulfuric acid and sodium dichromate, said process comprising:
    (a) treating the waste pickling liquor with a reducing agent which converts the hexavalent chromium content of the liquor to trivalent chromium and leaves the copper ion in solution until the hexavalent chromium content of said liquor is less than about 2 grams per liter (expressed as elemental chromium);
    (b) contacting the liquor treated in step (a) with a reducing agent which reduces the copper ion content of the liquor to metallic copper and leaves the trivalent chromium in solution until said copper content is lowered to a maximum of about 8 grams per liter (expressed as elemental copper);
    (c) separating the copper metal from the liquor treated in step (b);
    (d) concentrating the liquor at any stage in the process by evaporation until the chromium content of the liquor (expressed as $Cr_2O_3$) is between about 0.4 and 1.5 pounds per gallon; and
    (e) partially neutralizing the acidic liquor with a chemical base at any stage in the process until the ratio of hydroxyl ions to trivalent chromium ions is between about [1.3 and 2.1] 1:3 and 2:1.

2. The method according to claim 1 in which the neutralization step is the first of all of the recited steps.

3. The method according to claim 1 in which the concentration step is the last of all of the recited steps.

4. The method according to claim 1 in which the neutralization step is the first and the concentration step is the last of all the recited steps.

5. The method according to claim 1 in which substantially all of the hexavalent chromium content of the liquor is converted in step (a) to trivalent chromium.

6. The method according to claim 1 in which the reducing agent used in step (a) is sulfur dioxide.

7. The method according to claim 1 in which reduction in step (b) of the copper content of the liquor treated in step (a) is effected by adding to said liquor a metal selected from the group consisting of iron, aluminum, zinc and alloys of iron, aluminum and zinc.

8. The method according to claim 1 in which the copper content of the liquor treated in step (a) is lowered in step (b) to a maximum of about 4 grams per liter.

9. The method according to claim 1 in whch the concentration by evaporation is effected to the extent of raising the chromium content (expressed as $Cr_2O_3$) of the solution to about 1 pound per gallon.

10. The method according to claim 1 in which the neutralization is effected at any stage of the method following the step of reducing the hexavalent chromium to trivalent chromium.

References Cited

UNITED STATES PATENTS

| 2,178,874 | 11/1939 | Hervey | 8—94.26 |
| 2,500,020 | 3/1950 | Binns | 8—94.26 |
| 937,720 | 10/1909 | Schmid | 8—94.25 X |

OTHER REFERENCES

Hoover et. al. Industrial and Engineering Chemistry, Jan. 1941, Vol. 33, No. 1, pp. 131–134.

Merry, E. W., The Chrome Tanning Process, 1936, p. 29 TS 965 M 47.

LEON D. ROSDOL, Primary Examiner

HAROLD WOLMAN, Assistant Examiner

U.S. Cl. X.R.

8—94.25, 94.26, 94.29; 210—50, 59

UNITED STATES PATENT OFFICE
CERTIFICATE OF CORRECTION

Patent No. 3,822,993  Dated July 9, 1974

Inventor(s) John W. Robinson, John W. Howard, Robert E. Hahn, and Donald G. Hemming It is certified that error appears in the above-identified patent and that said Letters Patent are hereby corrected as shown below:

Column 3, line 6, "2.1" should read --2:1--.

Column 5, line 21, "2.5" should read --2.6--.

Signed and sealed this 8th day of October 1974.

(SEAL)
Attest:

McCOY M. GIBSON JR.  C. MARSHALL DANN
Attesting Officer  Commissioner of Patents